United States Patent [19]
Naito et al.

[11] 3,925,332
[45] Dec. 9, 1975

[54] HYDROPHILIC MEMBRANE AND PROCESS FOR THE PREPARATION THEREOF

[75] Inventors: Hirokuni Naito, Hino; Isao Yoshimura, Fujisawa; Hiroo Nakano, Kawasaki, all of Japan

[73] Assignee: Asahi-Dow Limited, Tokyo, Japan

[22] Filed: June 18, 1974

[21] Appl. No.: 480,579

[52] U.S. Cl. ......... 260/79.3 R; 204/296; 260/2.1 E; 260/2.1 R; 260/DIG. 6
[51] Int. Cl.² ................... C08F 28/00; C08G 75/00
[58] Field of Search ......... 260/79.3 R, 2.1 R, 2.1 E; 204/296

[56] References Cited
UNITED STATES PATENTS

| | | | |
|---|---|---|---|
| 2,858,264 | 10/1958 | de Jong | 204/296 |
| 2,948,637 | 8/1960 | Hookway et al. | 204/296 |
| 3,247,133 | 4/1966 | Chen | 204/296 |
| 3,276,990 | 10/1966 | Hani et al. | 204/296 |
| 3,320,218 | 5/1967 | Levine | 260/79.3 R |
| 3,510,418 | 5/1970 | Mizutani et al. | 204/296 |
| 3,676,326 | 7/1972 | Marze | 204/296 |
| 3,821,127 | 6/1974 | Mizutani et al. | 204/296 |

FOREIGN PATENTS OR APPLICATIONS
1,001,669  1/1957  Germany .................... 260/79.3 R

*Primary Examiner*—Ronald W. Griffin
*Attorney, Agent, or Firm*—Cushman, Darby & Cushman

[57] ABSTRACT

A film or tube of a specific copolymer of ethylene with 3.0 to 18.0 mole % of a comonomer containing a polar functional group, for example, vinyl acetate is treated with a sulfonating agent at a lower temperature for a short time to give a hydrophilic membrane excellent in hydrophilic properties as well as other properties such as folding endurance or alkali resistance. The hydrophilic membrane is useful as ion-exchange membrane, separator for storage battery or dialysis diaphragm. It is also similar to cellophane in transparency as well as in properties and therefore can be used in, for example, processing of a smoked ham.

11 Claims, 1 Drawing Figure

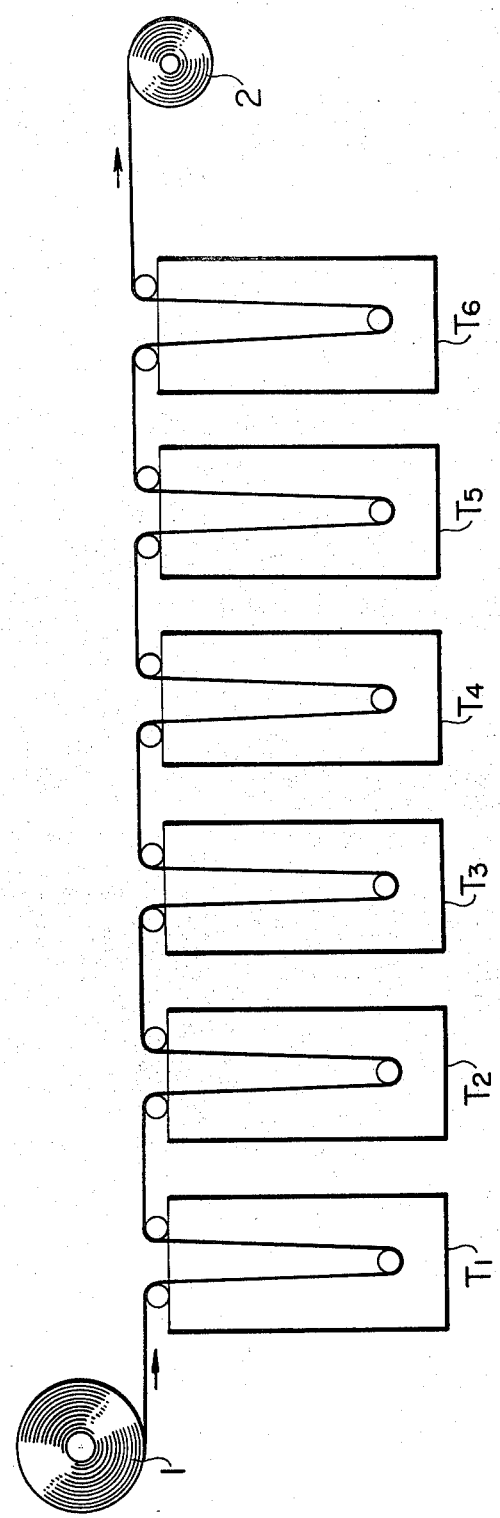

HYDROPHILIC MEMBRANE AND PROCESS FOR THE PREPARATION THEREOF

This invention relates to a novel hydrophilic membrane and a process for producing the same. More particularly, this invention pertains to a hydrophilic membrane which is excellent in mechanical strength as well as in hydrophilic properties and useful for ionexchange membranes, separators for storage battery or dialysis membranes, being obtained by incorporating sulfonic acid groups into a copolymer of ethylene with a monovinyl monomer having a specific polar functional group.

Methods of preparation of hydrophilic membranes by incorporating hydrophilic groups such as the sulfonic acid group into a film of ethylenic polymer substrate such as polyethylene film is old. Hydrophilic membranes obtained by direct sulfonation of a polyethylene film with a sulfonating agent such as conc. sulfuric acid are degraded in physical properties. This is because sulfonation must be carried out under very severe conditions, at a high temperature for a long time, since polyethylene is not very reactive with said sulfonating agent. In order to improve the reactivity of polyethylene, various pre-treatments have been suggested. For example, as disclosed in J. Polymer Sci. 23 903 (1957), reactive monomers such as styrene are graft polymerized onto a polyethylene film by irradiation of radio-active rays before introduction of sulfonic acid groups. More recently, alcoholic hydroxyl groups have been found to provide reactive sites for incorporation of sulfonic acid groups. Japanese Pat. No. 21157/65 discloses a method wherein vinyl acetate is grafted onto polyethylene, the grafted polyethylene film is then subjected to deacetylation and further to sulfation. Meanwhile, U.S. Pat. No. 3,676,326 discloses a process for preparation of a cation exchange membrane, which comprises treating an ethylene-alcohol copolymer film with sulfonating agents to convert alcoholic groups contained therein into $SO_4H$ groups. However, in these hydrophilic membranes, active hydrophilic groups are present in the form of esters and therefore they are easily hydrolyzed either in acidic or alkaline solutions. Accordingly, these membranes are inferior in resistance to alkalis and acids. Furthermore, because the film is treated with sulfonating agents for a considerably long time, the membrane obtained is degraded in physical properties such as mechanical strength or folding endurance.

An object of the present invention is to provide a hydrophilic membrane improved in resistance to alkalis and acids, which is excellent in hydrophilic properties as well as in physical properties, particularly folding endurance.

The other object of the present invention is to provide a process for producing the improved membrane as mentioned above, which is easy in operation and very economical.

It has now been unexpectedly found that a film or tube of a copolymer of ethylene with a specific comonomers is very reactive with a sulfonating agent. Namely, it has been found that there is obtained a hydrophilic membrane entirely unknown in the art when a film or tube of a copolymer of ethylene with a vinyl monomer having a specific functional group is treated with a sulfonating agent under mild conditions for a short time. The hydrophilic membrane thus obtained is characteristic in that it contains 0.5 to 4.0 milliequivalents of sulfonic acid groups or salts thereof per gram of dry membrane, has an effective resistivity of 0.002 to 2 $\Omega.cm^2$ and a folding endurance of 100 times or more and further that it is very resistant to alkalis and acids.

The hydrophilic membrane of the present invention is prepared by sulfonating a substrate of a film or tube of a polymeric composition comprising a copolymer of ethylene copolymerized with 3.0 to 18.0 mole % of a comonomer of the formula:

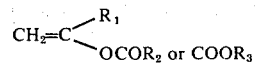

wherein $R_1$ is hydrogen or a methyl group, $R_2$ is an alkyl group with 1 to 5 carbon atoms and $R_3$ is hydrogen or an alkyl group with 1 to 6 carbon atoms, or an ionically crosslinked derivative thereof (only when $R_3$ is hydrogen). Typical examples of the copolymer are ethylene-vinyl acetate copolymer, ethylene-vinyl propionate copolymer, ethylene acrylic acid copolymer (or ionically crosslinked derivative thereof), ethylenemethacrylic acid copolymer (or ionically crosslinked derivative thereof), ethylene-methyl acrylate, ethyleneethyl acrylate and ethylene-methyl methacrylate.

It is critically required in the present invention that the above copolymer should have a specific monomeric composition. Namely, the content of the comonomer should be within the range of 3.0 to 18.0 mole %, preferably 5.0 to 15.0 mole %. If the content of the comonomer is less than 3.0 mole %, the film is inert to sulfonation according to the procedure of the present invention. On the contrary, if said content is more than 18.0 mole %, the film is excessively swelled during or after treatment with the sulfonating agent to form "crease" and the membrane obtained is brittle or inhomogeneous. Furthermore, the membrane obtained is inferior in folding endurance and has too large a degree of water absorption and swelling ratio at the time of wetting. Therefore, when wetting-drying is repeated frequently, there occur cracks which make the membrane fragile. The copolymer is required to contain the aforesaid comonomer within said range also because no uniformly thin film or tube is obtained from a copolymer containing more than 18.0 mole % of the comonomer either by extrusion molding or casting from a solution.

The above copolymers may be used alone or in mixtures. It is also found that favorable results are obtained even when these copolymers are used in a blended mixture with polyethylene and/or crystalline polypropylene. Such a blend contains 30 wt.% or more of the copolymer and 70 wt.% or less, preferably 50 wt.% or less of polyethylene and/or crystalline polypropylene. In this case, it is preferred to use a copolymer containing at least 6.0 mole % of the aforesaid comonomer.

The polymeric composition is formed into films or tubes to be provided as a substrate for the membrane of the present invention. The thickness of the film is usually from 5 $\mu$ to 150 $\mu$. The term "film or tube" herein used refers to a shaped article in the form of flat sheets, tubes, pipes, hollow fibers, heat-sealed bag, etc. Any molding technique such as an extrusion molding method or film casting method may be employed. Usually, the film is molded by extrusion. For this purpose, the copolymer should preferably have a melt viscosity of 0.5 to 60, more preferably 1.0 to 25, in terms of melt index measured according to the method of ASTM-D 1238-62T.

The membrane of the present invention is obtained by sulfonating the polymeric composition as described above under specific sulfonating conditions.

For the purpose of sulfonating a film or tube effectively in a short time, it is desirable to use a sulfonating agent which is highly reactive with the substrate. From this standpoint, it has been found that fuming sulfuric acid and chlorosulfonic acid are preferably used as such a sulfonating agent. Above all, a fuming sulfuric acid is found to be the most effective sulfonating agent for the film or tube of the present invention. Whereas, conc. sulfuric acid or a dilute chlorosulfonic acid dissolved in a solvent such as acetic acid is less effective, namely very slow in sulfonation reaction. Accordingly, sulfonated products obtained by using these sulfonating agent are sometimes deficient in the well balanced properties of the present invention, because they are degraded in physical properties during a prolonged sulfonation treatment. The fuming sulfuric acid, which is a preferable sulfonating agent, contains 3 to 65 wt.%, usually 3 to 40 wt.% of free $SO_3$.

The sulfonation treatment is performed at a temperature which is low enough to avoid harmful side reactions such as oxidative degradation reaction, dehydration and other reactions which cause deterioration in physical properties of the hydrophilic membrane of the present invention. The treatment temperature is therefore 60°C or lower, preferably 50°C or lower. If sulfonation is performed at a temperature over said temperature range, the film is liable to be deteriorated and not exhibit the excellent characteristics of the present invention. For example, if sulfonation is performed under such a severe condition as at 80° to 90°C, it is deteriorated until carbonized. The reaction time, for the same reasons as mentioned above as well as for economical reasons, is usually from 10 seconds to 30 minutes, most preferably from 10 seconds to 10 minutes. If the reaction time is less than 10 seconds, the reaction is liable to be insufficient and not uniform.

The extent of sulfonation varies depending on many factors, primarily on the concentration of the polar functional group in the polymeric composition, the treatment temperature, and the treatment time. It is remarkable that there is a critical upper limit of the extent of sulfonation corresponding to the concentration of the functional group in the polymeric composition. In other words, the maximum amount of sulfonic acid groups which can be attached is greater as the content of the polar functional groups is increased. Therefore, the extent of sullfonation can be controlled within the range lower than said maximum amount by varying the reaction time or the reaction temperature. For example, when a film of a copolymer containing 6.5 mole % of vinyl acetate is sulfonated with a fuming sulfuric acid containing 10 wt.% free $SO_3$ at 35°C for 2 minutes, there is obtained a sulfonated membrane containing 2.0 meq/g of sulfonic acid groups. Whereas, a sulfonated membrane with the same content of sulfonic acid groups is also obtained when a film of a copolymer containing 12 mole % of vinyl acetate is treated under the same sulfonating conditions except for the treatment time of one minute. However, in many cases, it is more convenient to control the extent of sulfonation by selection of a copolymer with a suitable polar functional group content under the predetermined conditions optimized for the required properties of the membrane fitted for the intended use. For example, according to the most preferred embodiment of the process of the present invention for producing a hydrophilic membrane which is suitably used as a separator for storage battery, a copolymer of ethylenevinyl acetate or ethylene-ethyl acrylate containing 5.0 to 8.0 mole % of vinyl acetate or ethyl acrylate is used as substrate material. The copolymer is thermoplastified in an extruder and extruded through a die at 130° to 220°C, followed by, if necessary, quenching with water, to be formed into a thin film. The thin film is then treated in a fuming sulfuric acid containing 10 wt.% free $SO_3$ at 20° to 40°C for 1 to 3 minutes. The membrane obtained with thickness of 20 to 60 $\mu$ has an effective resistivity of 0.02 to 0.1 $\Omega.cm^2$, a folding endurance of 3000 times or more and an ion-exchange equivalent of 1.5 to 2.5 meq/g.

In the above sulfonation procedure, either continuous or non-continuous operation may be practiced. For example, when a continuous film or tube is used as a substrate, it may be treated continuously. On the other hand, in case of different shapes such as a bag, the substrate is treated non-continuously.

After sulfonation treatment, the membrane is washed thoroughly with water after the treating agent attached to the membrane is sufficiently diluted. Furthermore, it may be neutralized with an alkaline substance to convert sulfonic acid groups to $-SO_3M$ (wherein M is an ion such as Na, Li, K, Ca, Th, La, Cr, St, Mg, Rb, or $NH_4$), followed by washing with water and dried.

Referring now to the annexed drawing of a vertical cross-sectional view of one example of apparatus suitable for practicing the process of the present invention continuously, 1 is a roll of untreated film, 2 a roll of treated film and $T_1$ to $T_6$ are treatment tanks. $T_1$ is a tank containing fuming sulfuric acid; $T_2$ a tank containing conc. sulfuric acid; $T_3$ is a tank containing dil. sulfuric acid; $T_4$ a tank for washing with water; $T_5$ a tank for neutralization; and $T_6$ a tank for washing with water. The film is travelled along plural rollers through the respective tanks and the treatment time can be controlled by varying the travelling speed of the film.

It is of interest to note that no polymer film other than the copolymer of the invention as specified above can be sulfonated under the sulfonation conditions as described above. For example, when a film derived from ethylene homopolymer or a saponified ethylenevinyl acetate copolymer is treated under the above sulfonation conditions, there is obtained no membrane having the desirable properties according to the present invention. As mentioned above, the copolymer to be used in the present invention has a specific functional group which seems to make it easy to attach sulfonic acid groups to carbon atoms in the skeltal structure of the copolymer. Therefore, the copolymer can be treated with a sulfonating agent at a lower temperature for a very short time to complete the desired reaction, thereby being prevented from deterioration of the polymer substrate.

The hydrophilic membrane obtained according to the process of the present invention is endowed with excellent hydrophilic properties, ion-exchange capacity and electrochemical properties which are permanent in nature. In addition, there is litte degradation in other physical properties, because the substrate film is treated at a low temperature for short duration. Furthermoe, it is resistant to acids and alkalis.

I. Hydrophilic properties

The hydrophilic membrane of the present invention has a water absorption degree within the range from 10 to 150 wt.%. The "water absorption degree" in the specification refers to the value calculated according to the following formula:

$$\text{Water absorption degree }(\%) = \frac{W_w - W_d}{W_d} \times 100$$

wherein $W_w$ and $W_d$ are wet and dry weights of the membrane, respectively, when the sulfonated membrane (in which the sulfonic acid groups are in the state of the potassium salt) is dipped in pure water for 10 minutes and thereafter dried under a warm air stream at 60°C for one hour.

On the other hand, the membrane of the present invention exhibits a swelling ratio as much as 5 to 100%, in terms of the areal swelling ratio calculated according to the following formula:

$$\text{Areal swelling ratio }(\%) = \frac{S_w - S_d}{S_d} \times 100$$

wherein $S_w$ and $S_d$ are dry and wet areas of the membrane, respectively, when the sulfonated membrane (in which the sulfonic acid groups are in the state of the potassium salt) is dipped in pure water for 10 minutes and thereafter dried under warm air stream at 60°C for one hour.

II. Ion-exchange capacity

The hydrophilic membrane of the present invention contains sulfonic acid groups in an amount of 0.5 to 4.0 milliequivalents per gram of dry membrane, in terms of the ion-exchange equivalent calculated according to the following formula:

$$\text{Ion-exchange equivalent (milliequivalents/gram)} = \frac{1/10 \cdot f \cdot X}{W_d}$$

wherein X is the titration value (c.c.) when the sulfonated membrane of sulfonic acid ($-SO_3H$) type is equilibrated in 1 N aqueous calcium chloride solution and the hydrochloric acid formed thereby is titrated with 0.1 N aqueous caustic soda solution (factor: f) by using phenolphthalein as indicator, and $W_d$ is the dry weight of the membrane in the state of the potassium salt.

It is noteworthy that the sulfonic acid groups incorporated seem to be bonded directly to carbon atoms in the skeltal of the copolymer, as different from the structure of sulfuric acid ester. This is evidenced by the fact that the membrane of the present invention exhibits strong absorption bands specific in sulfonic acid groups, and absorbances remain substantially unchanged even after it is saponified in 30 wt.% KOH methanol solution at 80°C for 5 hours. The above assumption is further supported by the fact that the ion-exchange equivalent and electric resistance remain substantially unchanged after said saponification treatment.

III. Electric resistance (effective resistivity)

The membrane of the present invention has an effective resistivity of 0.002 to 2 $\Omega.cm^2$ when measured by the modified method as specified in JIS (Japanese Industrial Standard) C 2313 and calculated by the following formula:

$$\text{Effective resistivity }(\Omega.cm^2) = \frac{V_1 - V_o}{A} \times S$$

wherein $V_1$ is the voltage measured when the sample is inserted and $V_o$ is that when the holding plate is set without insertion of the sample by using dil. sulfuric acid (sp.gr. = 1.200 at 20°C), A is the current value which is adjusted to 0.200 ampere, S is the area of perforation on the holding plate (2 $cm^2$).

A hydrophilic membrane having a high electric resistance cannot practically be used for a separator in a storage battery, because the capacitance of a storage battery is too small even if it may have sufficient ion-exchange capacity. As ion-exchange membranes to be used in electrodialysis, the electric resistance of the membrane is as small as possible for the practical value by the decrease in energy consumption. In these respects, the membrane of the present invention is advantageous over typical ion-exchange membranes derived from styrene polymer substrates.

IV. Physical properties

As mentioned above, the hydrophilic membrane of the present invention has also excellent physical properties. As to tensile strength measured by the method as specified in ASTM-D638-71a, it has a tensile strength of 50 kg/cm² or more, preferably 100 kg/cm² or more. For example, the membrane obtained in Run No. 1 of Example 1 as hereinafter shown has a tensile strength as much as 450 kg/cm² with an elongation of 56%, while the substrate film before sulfonation treatment has a tensile strength of 110 kg/cm² with an elongation of 750%.

One of the particular features of the physical properties of the membrane of the present invention is its similarity to cellophane. Namely, the membrane obtained in Example 1 (Run No. 1) has a water vapor transmission (WVT) of 920 g/m² 0.24 hour measured by the method of ASTM-E96-63T. In addition, the membrane of the present invention is transparent enough to permit one to read written letters clearly through the membrane. Accordingly, the membrane of the present invention can be utilized in such uses as a casing material for smoked ham for which cellophane has conventionally been used.

Furthermore, it is very important that the hydrophilic membrane have a very high folding endurance, which is as much as 100 times or more. Folding endurance is measured according to the method "Folding endurance of paper by the M.I.T. tester" (ASTM-D2176-63T), wherein a dry membrane is folded under a load of 0.5 Kg through an angle of 135°±5° both to the right and to the left of the position of the unfolded specimen repeatedly until it is broken. Unless otherwise noted, the measurement is performed by using a membrane sample which is in the state of the potassium salt. For example, the membranes obtained in Example 1 are not broken until 3000 times or more of folding. On the other hand, a uniform membrane derived from a styrene polymer substrate of the prior art has a folding endurance of one time or less. High folding endurance leads to the advantage that plural electrodes can be separated by one continuous sheet of the membrane.

V. Chemical resistance

The outstanding feature of the present hydrophilic membrane, which is distinguished from the prior art membrane derived from ethylene-vinyl alcohol copolymer, consists in its high resistance to chemicals, especially alkalis and acids. This, it is considered, is also ascribable to the sulfonic acid groups bonded directly to the carbon atom. If the hydrophilic groups are present in the form of esters as in the prior art membrane, they are easily hydrolyzed under either alkaline or acidic conditions, whereby hydrophilic properties as well as electrochemical properties are changed greatly. When the membrane of the present invention is treated in 30 wt.% alcoholic KOH solution at its boiling temperature for 5 hours, there is no substantial change in absorbances of IR spectral bands corresponding to sulfonic acid groups at 1260 to 1150 cm$^{-1}$ and 1080 to 1010 cm$^{-1}$, and also in properties such as folding endurance, ion-exchange equivalent and electric resistance. On the other hand, when a membrane containing sulfuric acid ester groups is saponified under the same conditions, it is confirmed that most of absorption corresponding to the sulfuric acid ester group has disappeared according to IR analysis. High chemical resistance leads to the advantage that the membrane can be used suitably, for example, in an alkaline storage battery which is heated up to about 100°C by the heat generated during electric charge and discharge. Similarly, the membrane of the present invention can be used in a fuel cell of the hydrogen-oxygen type wherein an alkaline electrolyte and ion-exchange membrane are used and which is operated at a temperature of about 100°C.

Furthermore, the membrane of the present invention is also resistant to heat. For example, a membrane containing sulfonic acid groups in the form of a metal salt does not substantially change after being treated at 150°C for 5 hours.

Thus the membrane of the present invention is useful as an ion-exchange membrane, separator for storage or fuel cell or dialysis diaphragm and can be also a substitute for cellophane.

The present invention will now be explained in more detail by referring to the following Examples, wherein the properties of the membrane are measured according to the methods as previously described.

EXAMPLE 1

An ethylene-vinyl acetate copolymer containing 7.3 mole % vinyl acetate and having a melt index of 2.5 is thermoplastified at 170° to 200°C in an extruder and extruded through a circular die to form film. The film thus obtained is treated in a fuming sulfuric acid containing 10% free SO$_3$ under various conditions, followed by washing with water, neutralization with KOH, washing with water and drying, to obtain membrane having the properties as set forth in Table 1.

When the membrane of Run No. 1 is used as a dialysis membrane which is positioned between a solution containing 200 g/l NaOH and 30 g/l hemicellulose and water, the ratio of NaOH/hemicellulose transported by dialysis amounts to 84 which is 2.1 times as much as the ratio when conventional parchment paper is used as a dialysis diaphragm. This shows that the present membrane is also excellent as a dialysis diaphragm. When the membranes of this Example are treated in 30 wt.% KOH soln. or in H$_2$SO$_4$ soln. with a specific gravity of 1.2 at 70°C for 720 hours, the physical properties are not substantially changed.

Table 1

|  | Run No. 1 | Run No. 2 |
|---|---|---|
| Sulfonation conditions: | | |
| Time (minutes) | 2 | 4 |
| Temperature (°C) | 25 | 25 |
| Properties: | | |
| Film thickness ($\mu$) | 32 | 78 |
| Ion-exchange equivalent (meq/g) | 2.5 | 2.1 |
| Water absorption degree (%) | 46 | 42 |
| Effective resistivity ($\Omega$.cm$^2$) | 0.052 | 0.087 |
| Swelling ratio (%) | 35 | 30 |
| Folding endurance (times) | over 3000 | 1700 |
| Tensile strength (Kg/cm$^2$) | 450 | 280 |
| Elongation (%) | 56 | 70 |

EXAMPLE 2

Various copolymers as set forth in Table 2 are fabricated into films and treated similarly as in Example 1. The membranes obtained have properties as shown in Table 3.

Table 2

| Run No. | Copolymer composition | Content of comonomer (mole %) | Melt index |
|---|---|---|---|
| 5 | Ethylene-vinyl acetate | 3.7 | 4.0 |
| 6 | " | 11.0 | 4.0 |
| 7 | " | 5.4 | 2.5 |
| 8 | " | " | " |
| 9 | " | " | " |
| 10 | Ethylene-ethyl acrylate | 6.5 | 6.0 |
| 11 | " | " | " |
| 12 | " | " | " |
| 13 | " | " | " |
| 14 | Ethylene-methyl methacrylate | 8.0 | 4.5 |
| 15 | Ionomer resin (Na crosslinked ethylene-acrylic acid) | 6.3 | 5.5 |
| 16 | Blend of 60 wt.% ethylene-vinyl acetate (vinyl acetate: 11.0 mole %; MI= 25.0) and 40 wt.% polyethylene (density = 0.918 g/cm$^3$; MI = 1.0) | — | — |
| 17 | Ethylene-acrylic acid | 6.5 | 10.0 |

Table 3

| Run No.: | 5 | 6 | 7 | 8 | 9 | 10 |
|---|---|---|---|---|---|---|
| Sulfonation conditions: | | | | | | |
| Time (minutes) | 5 | 3 | 0.3 | 2 | 5 | 0.3 |
| Temperature (°C) | 30 | 20 | 25 | 25 | 25 | 30 |
| Properties: | | | | | | |
| Film | | | | | | |

Table 3-continued

| Run No.: | 5 | 6 | 7 | 8 | 9 | 10 |
|---|---|---|---|---|---|---|
| thickness ($\mu$) | 35 | 43 | 35 | 36 | 38 | 38 |
| Ion-exchange equivalent (meq/g) | 1.2 | 3.1 | 1.1 | 1.4 | 1.6 | 0.8 |
| Water absorption degree (%) | 27 | 80 | 27 | 41 | 50 | 20 |
| Effective resistivity ($\Omega \cdot cm^2$) | 0.126 | 0.041 | 0.195 | 0.072 | 0.062 | 0.160 |
| Swelling ratio (%) | 15 | 59 | 16 | 22 | 33 | 19 |
| Folding endurance (times) | 1800 | 420 | over 3000 | over 3000 | 2600 | over 3000 |
| Tensile strength (Kg/cm$^2$) | 320 | 180 | 120 | 175 | 320 | 240 |
| Elongation (%) | 110 | 20 | 120 | 75 | 40 | 90 |

| Run No.: | 11 | 12 | 13 | 14 | 15 | 16 | 17 |
|---|---|---|---|---|---|---|---|
| Sulfonation conditions: Time (minutes) | 2 | 6 | 10 | 3 | 3 | 7 | 3 |
| Temperature (°C) | 30 | 30 | 30 | 28 | 30 | 25 | 28 |
| Properties: Film thickness ($\mu$) | 40 | 41 | 41 | 55 | 47 | 80 | 42 |
| Ion-exchange equivalent (meq/g) | 1.6 | 2.1 | 2.3 | 1.8 | 1.5 | 0.8 | 1.7 |
| Water absorption degree (%) | 35 | 42 | 62 | 44 | 37 | 87 | 35 |
| Effective resistivity ($\Omega \cdot cm^2$) | 0.105 | 0.071 | 0.060 | 0.100 | 0.081 | 0.105 | 0.055 |
| Swelling ratio (%) | 24 | 30 | 47 | 27 | 18 | 28 | 20 |
| Folding endurance (times) | over 3000 | 2500 | 870 | 2300 | over 3000 | 260 | 2500 |
| Tensile strength (Kg/cm$^2$) | 320 | 370 | 260 | 320 | 360 | 210 | 310 |
| Elongation (%) | 60 | 34 | 20 | 40 | 65 | 30 | 42 |

It is apparently seen from Table 3 that the membranes of the present invention have excellent hydrophilic properties as well as physical properties. Furthermore, the transport number of the membrane of Run No. 5 is measured to be 0.80, and the specific electric resistance of the same membrane measured by ordinary method in 0.5 N aqueous NaCl solution is 75 $\Omega \cdot cm^2$ showing that said membrane has sufficient properties as an ionexchange membrane.

COMPARATIVE EXAMPLE

Comparative tests are performed to show that no hydrophilic membrane of the present invention can be obtained from polymers or under conditions different from those as specified in the present invention. The polymers and the properties of the membranes derived therefrom are listed in Table 4 and Table 5, respectively. Each polymer is processed into film similarly as in Example 1. In test No. 1 and No. 3 through No. 5, sulfonation is carried out in fuming sulfuric acid containing 10% free SO$_3$; in test No. 2, in 95% conc. sulfuric acid; and in test No. 6 and No. 7, in an acetic acid solution containing 30 wt.% chlorosulfonic acid.

Table 4

| Test No. | Polymer | Melt index | Remarks |
|---|---|---|---|
| 1 | Ethylene-vinyl acetate (2.5 mole % vinyl acetate) | 0.7 | — |
| 2 | Ethylene-vinyl acetate (7.3 mole % vinyl acetate) | 2.5 | — |
| 3 | Low density polyethylene | 1.0 | density= 0.917 g/cm$^3$ |
| 4 | " | " | " |
| 5 | " | " | " |
| 6 | 95% saponified product of ethylene-vinyl acetate (7.3 mole % vinyl acetate in original copolymer) | 2.5 (original copolymer) | After film formation, saponified in 10 wt.% KOH methanol soln. |
| 7 | Ethylene-vinyl acetate (5.4 mole % vinyl acetate) | 2.5 | |

Table 5

| Test No.: | 1 | 2 | 3 | 4 | 5 | 6 | 7 |
|---|---|---|---|---|---|---|---|
| Sulfonation conditions: Sulfonating agent | fuming sulfuric acid | conc. sulfuric acid | fuming sulfuric acid | | | chlorosulfonic acid in acetic acid | |
| Time (minutes) | 300 | 120 | 2 | 300 | 1200 | 300 | 120 |
| Temperature (°C) | 30 | 80 | 50 | 50 | 50 | 60 | 60 |
| Properties: Film thickness ($\mu$) | 52 | 52 | 50 | 51 | 53 | 82 | 32 |
| Ion-exchange equivalent (meq/g) | 0.2 | 0.05 | 0 | 0.1 | 0.7 | 1.3 | 0 |
| Water absorption degree (%) | 5 | — | 0 | 5 | 23 | 20 | 2 |
| Effective resistivity ($\Omega.cm^2$) | $\infty$ | $\infty$ | $\infty$ | $\infty$ | 0.315 | 0.310 | $\infty$ |
| Swelling ratio (%) | 2 | — | 0 | 2 | 7 | 12 | 3 |
| Folding endurance (times) | — | — | — | — | 2 | 43 | — |
| Tensile strength (Kg/cm$^2$) | — | — | 120 | — | 78 | 115 | — |
| Elongation (%) | — | — | 700 | — | 20 | 60 | — |

The membrane of test No. 1 cannot be uniformly treated and is high in effective resistivity and low in ion-exchange equivalent.

The membrane of test No. 2 treated at 80°C for 2 hours is deformed in shape and degraded to be discolored black. This membrane has little ion-exchange equivalent and is very high in electric resistance, which is different from the membrane of the present invention.

Polyethylene films of test No. 3 to 5 cannot be effectively sulfonated by short time treatment. After prolonged treatment (test No. 5), the membrane is degraded and does not have the excellent characteristics of the present invention.

In test No. 6, there is used a film of ethylenevinyl acetate which has been saponified to 95% in 10 wt.% KOH-methanol solution refluxed for 5 hours. The sulfonated membrane derived from this film is tested for alkali and acid resistance. When it is treated in dil. sulfuric acid (specific gravity = 1.2) at 80°C for 8 hours, the ion-exchange equivalent is decreased to 0.12 (meq/g). On the other hand, when it is treated in 30 wt.% aqueous KOH solution at 80°C for 8 hours, the ion-exchange equivalent is decreased to 0.25 (meq/g). This is considered to be due to the fact that sulfonic acid groups are introduced into this type of copolymer in the form of sulfuric acid esters and hence they are removed by saponification or other reactions easily when treated in acids or alkalis.

The result of test No. 7 shows that the dilute solution of chlorosulfonic acid in acetic acid is not suitable for sulfonating the copolymer of the present invention.

What is claimed is:

1. A hydrophilic membrane of a sulfonated product of a film or tube made of a polymeric composition comprising a copolymer of ethylene with 3.0 to 18.0 mole % of a comonomer of the formula

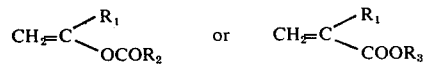

wherein $R_1$ is hydrogen or a methyl group, $R_2$ is an alkyl group with 1 to 5 carbon atoms and $R_3$ is hydrogen or an alkyl group with 1 to 6 carbon atoms, or an ionically crosslinked derivative of such a copolymer when $R_3$ is hydrogen, said membrane containing sulfonic acid groups or salts thereof in an amount of 0.5 to 4.0 milliequivalents per gram of dry membrane, having excellent alkali resistance and having an effective resistivity of 0.002 to 2 $\Omega.cm^2$ and a folding endurance of at least 100 times.

2. A hydrophilic membrane as claimed in claim 1 wherein the polymeric composition consists of at least one copolymer of ethylene-vinyl acetate, ethylene-vinyl propionate, ethylene-acrylic acid, ionically crosslinked derivative of ethylene-acrylic acid, ethylene-methacrylic acid, ionically crosslinked derivative of ethylene-methacrylic acid, ethylene-methyl acrylate, ethylene-ethylacrylate and ethylene-methyl methacrylate.

3. A hydrophilic membrane as claimed in claim 1 wherein the polymeric composition is a blended mixture consisting of 30 wt.% or more of at least one copolymer of ethylene-vinyl acetate, ethylene-vinyl propionate, ethylene-acrylic acid, ionically crosslinked derivative of ethylene-acrylic acid, ethylene-methacrylic acid, ionically crosslinked derivative of ethylene-methacrylic acid, ethylene-methyl acrylate, ethylene-ethyl acrylate and ethylene-methyl methacrylate, and 70 wt.% or less of at least one of polyethylene and cyrstalline polyprophlene.

4. A process for producing a hydrophilic membrane as claimed in claim 1, comprising treating a film or tube made of a polymeric composition comprising a copolymer of ethylene with 3.0 to 18.0 mole % of a comonomer of the formula:

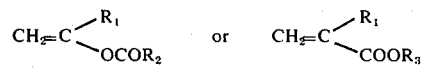

wherein $R_1$ is hydrogen or a methyl group, $R_2$ is an alkyl group with 1 to 5 carbon atoms and $R_3$ is hydrogen or an alkyl group with 1 to 6 carbon atoms, or an ionically cross-linked derivative of such a copolymer when $R_3$ is hydrogen, with a sulfonating agent at a temperature of 60°C. or lower for a treatment time from 10 seconds to 30 minutes.

5. A process according to claim 4, wherein the sulfonating agent is a fuming sulfuric acid.

6. A process as claimed in claim 5 wherein the treatment time is from 10 seconds to 10 minutes.

7. A process as claimed in claim 4 wherein the film or tube is obtained by extruding the polymeric composition.

8. A process as claimed in claim 4 wherein the polymeric composition consists of at least one copolymer of ethylene-vinyl acetate, ethylene-vinyl propionate, ethylene-acrylic acid, ionically crosslinked derivative of ethylene-acrylic acid, ethylene-methacrylic acid, ionically crosslinked derivative of ethylene-methacrylic acid, ethylene-methyl acrylate, ethylene-ethyl acrylate and ethylene-methyl methacrylate.

9. A process according to claim 8 wherein the sulfonating agent is a fuming sulfuric acid.

10. A process as claimed in claim 4 wherein the polymeric composition is a blended mixture consisting of 30 wt.% or more of at least one copolymer of ethylene-vinyl acetate, ethylene-vinyl propionate, ethylene-acrylic acid, ionically crosslinked derivative of ethylene-acrylic acid, ethylene-methacrylic acid, ionically crosslinked derivative of ethylene-methacrylic acid, ethylene-methyl acrylate, ethylene-ethyl acrylate and ethylene-methyl methacrylate, and 70 wt.% or less of at least one of polyethylene and crystalline polypropylene.

11. A process according to claim 10 wherein the sulfonating agent is a fuming sulfuric acid.

* * * * *